United States Patent [19]
Madour et al.

[11] Patent Number: 6,108,518
[45] Date of Patent: Aug. 22, 2000

[54] METHOD OF CONTROLLING PAGING IN A PLURALITY OF MOBILE SWITCHING CENTERS IN A RADIO TELECOMMUNICATIONS NETWORK

[75] Inventors: Lila Madour, Kista, Sweden; Michel Houde, St.-Laurent, Canada

[73] Assignee: Telefonaktiebolaget LM Ericsson (publ), Stockholm, Sweden

[21] Appl. No.: 08/960,629

[22] Filed: Oct. 29, 1997

Related U.S. Application Data

[60] Provisional application No. 60/032,807, Dec. 9, 1996, and provisional application No. 60/057,820, Sep. 4, 1997.

[51] Int. Cl.[7] .................................................... H04Q 7/20
[52] U.S. Cl. ..................... 455/31.2; 455/31.3; 455/422; 455/458; 455/413
[58] Field of Search .................................. 455/31.3, 38.1, 455/413, 433, 458, 432, 524, 31.2

[56] References Cited

U.S. PATENT DOCUMENTS

| | | | |
|---|---|---|---|
| 5,381,464 | 1/1995 | O'Keefe et al. ......................... | 379/59 |
| 5,414,750 | 5/1995 | Bhagat et al. .......................... | 379/57 |
| 5,457,732 | 10/1995 | Goldberg .............................. | 455/31.3 |
| 5,548,816 | 8/1996 | DeVaney .............................. | 455/53.1 |
| 5,594,776 | 1/1997 | Dent ..................................... | 455/458 |
| 5,699,407 | 12/1997 | Nguyen ................................. | 455/462 |
| 5,711,006 | 1/1998 | Brochu et al. ......................... | 455/433 |
| 5,826,172 | 10/1998 | Ito et al. ................................ | 455/458 |
| 5,873,042 | 2/1999 | Vo ......................................... | 455/458 |

FOREIGN PATENT DOCUMENTS

| | | |
|---|---|---|
| 0 454 647 A2 | 10/1991 | European Pat. Off. . |
| 0 454 648 A2 | 10/1991 | European Pat. Off. . |
| 0 544 456 A2 | 6/1993 | European Pat. Off. . |
| WO 95/23490 | 8/1995 | WIPO . |

*Primary Examiner*—Daniel S. Hunter
*Assistant Examiner*—Thuan T. Nguyen
*Attorney, Agent, or Firm*—Smith & Danamraj, P.C.

[57] ABSTRACT

A method of paging for a mobile station operating in a radio telecommunications network having a serving mobile switching center (MSC), a home location register (HLR), and a plurality of border MSCs. The method comprises the steps of paging for the mobile station in the serving MSC, and sending an intersystem paging message from the serving MSC to each of the plurality of border MSCs. The intersystem paging message includes an instruction to page the mobile station, an indication of a number of page attempts to perform, and an indication of a page response time for each page attempt. A total page response time is calculated in the serving MSC by taking into account the entry time of a Routing Request Invoke message, the signaling delay in the border system, the average time for designation of a voice channel, and an additional average time for transferring the call to voice mail in the event of a no page response condition. If a page response is received in one of the border MSCs prior to expiration of the maximum time period for completion of the page attempts, the method stops internal paging in the serving MSC and may send a release message from the serving MSC to the non-responding border MSCs from which no response was received, to release paging resources in the non-responding border MSCs. If no page response is received within the maximum time period allowed, the HLR may initiate transfer of the call to voice mail.

19 Claims, 9 Drawing Sheets

| InterSystemPage INVOKE Parameters | | | Timer: | ISPRT |
|---|---|---|---|---|
| Field | Value | Type | Reference | Notes |
| Identifier | SET [NATIONAL 18] | M | 6.3.2.1 | |
| Length | variable octets | M | 6.3.2.1 | |
| Contents | | | | |
| BillingID (Originating) | | M | 6.5.2.16 | |
| ElectronicSerialNumber | | M | 6.5.2.53 | |
| MobileIdentificationNumber | | M | 6.5.2.81 | |
| DMH_AccountCodeDigits | | O | 6.5.2.59 | a |
| Alertcode | | O | 6.5.2.3 | a |
| CallingPartyNumberString1 | | O | 6.5.2.23 | a |
| CallingPartyNumberString2 | | O | 6.5.2.24 | a |
| CallingPartySubaddress | | O | 6.5.2.25 | a |
| CDMASlotCycleIndex | | O | 6.5.2.40 | b |
| CDMAStationClassMark | | O | 6.5.2.41 | c |
| DMH_AlternateBillingDigits | | O | | a |
| DMH_BillingDigits | | O | | a |
| ExtendedMSCID (Serving MSC) | | O | | d |
| ExtendedSystemMyTypeCode (Serving MSC) | | O | | e |
| LegInformation | | O | | f |
| LocationAreaID | | O | | f |
| MobileDirectoryNumber | | O | | a |
| MSCID (OriginatingMSC) | | O | | g |
| MSCIdentificationNumber | | O | | f |
| OneTimeFeatureIndicator | | O | | f |
| PageCount | | O | | m |
| PageIndicator | | O | | h |
| PageResponseTime | | O | | n |
| PC_SSN (Originating MSC) | | O | | i |
| PilotBillingID | | O | | j |
| PilotNumber | | O | | k |
| RedirectingNumberString | | O | | a |
| RedirectingSubaddress | | O | | a |
| SenderIdentificationNumber | | O | | f |
| SystemMyTypeCode (OriginatingMSC) | | O | | l |
| TerminationTreatment | | O | | f |
| TerminationTriggers | | O | | a |

*FIG. 2*

| InterSystemPage RETURN RESULT Parameters | | | | | 36 |
|---|---|---|---|---|---|
| Field | Value | Type | Reference | Notes | |
| Identifier | SET [NATIONAL 18] | M | 6.3.2.2 | | |
| Length | variable octets | M | 6.3.2.2 | | |
| Contents | | | | | |
| AccessDeniedReason | | O | 6.5.2.1 | a | |
| BillingID (Terminating) | | O | 6.5.2.16 | b, c | |
| ConditionallyDeniedReason | | O | 6.5.2.48 | d | |
| Digits (Destination) | | O | 6.5.2.58 | c | |
| ExtendedMSCID (BorderMSC) | | O | 6.5.2.64 | c | |
| ExtendedSystemMyTypeCode (Border MSC) | | O | 6.5.2.65 | c | |
| MSCIdentificationNumber | | O | 6.5.2.83 | e | |
| PC_SSN (Border MSC) | | O | 6.5.2.93 | f | |

*FIG. 3*

| Release INVOKE Parameters | | | | Timer: none | 37 |
|---|---|---|---|---|---|
| Field | Value | Type | Reference | Notes | |
| Identifier | SET [NATIONAL 18] | M | 6.3.2.1 | | |
| Length | variable octets | M | 6.3.2.1 | | |
| Contents | | | | | |
| MobileIdentificationNumber | | O | 6.5.2.81 | a | 61 |

*FIG. 4*

| Field | Value | Type | Reference | Notes |
|---|---|---|---|---|
| Identifier | PageCount<br>IMPLICIT OCTET STRING | M | 6.5.1.2 | |
| Length | 1 octet | M | 6.5.1.1 | |
| Contents | | | | |

| H | G | F | E | D | C | B | A | octst | Notes |
|---|---|---|---|---|---|---|---|---|---|
| PageCount | | | | | | | | 1 | |

*FIG. 5*

| Field | Value | Type | Reference | Notes |
|---|---|---|---|---|
| Identifier | PageResponseTime<br>IMPLICIT OCTET STRING | M | 6.5.1.2 | |
| Length | 1 octet | M | 6.5.1.1 | |
| Contents | | | | |

| H | G | F | E | D | C | B | A | octst | Notes |
|---|---|---|---|---|---|---|---|---|---|
| PageResponseTime | | | | | | | | 1 | |

*FIG. 6*

| Field | Value | Type | Reference | Notes |
|---|---|---|---|---|
| Identifier | PageIndicator IMPLICIT OCTET STRING | M | 6.5.1.2 | |
| Length | 1 octet | M | 6.5.1.1 | |
| Contents | | | | |

| H | G | F | E | D | C | B | A | octet | Notes |
|---|---|---|---|---|---|---|---|---|---|
| \multicolumn{8}{c}{PageIndicator} | 1 | |
| \multicolumn{8}{c}{...} | n | a |

FIG. 7A

```
Page Indicator (octet 1)

Bits  H G F E D C B A    Value  Meaning
      0 0 0 0 0 0 0 0      0    Not used
      0 0 0 0 0 0 0 1      1    Page
      0 0 0 0 0 0 1 0      2    Listen only 0 0 0 0 0 0 1 1      3    ⎫
              ...       through ⎬ Reserved. Treat the same as
      1 0 1 1 1 1 1 1     223   ⎭ value 1, Page.

1 1 1 0 0 0 0 0     224   ⎫
              ...       through ⎬ Reserved for TIA?EIA-41 protocol
      1 1 1 1 1 1 1 1     255   ⎭ extension. If unknown, treat as
                                  value 1, Page.
```

FIG. 7B

METHOD OF CONTROLLING PAGING IN A PLURALITY OF MOBILE SWITCHING CENTERS IN A RADIO TELECOMMUNICATIONS NETWORK

CROSS-REFERENCES TO RELATED APPLICATIONS

This application is related to provisional application Ser. No. 60/032,807 entitled, System and Method of Controlling Inter-System Paging in a Radio Telecommunication Network, filed Dec. 9, 1996, and provisional application Ser. No. 60/057,820 entitled System and Method of Intersystem Paging in a Radio Telecommunications Network, filed Sep. 4, 1997.

BACKGROUND OF THE INVENTION

1. Technical Field of the Invention

This invention relates to radio telecommunication systems and, more particularly, to a method of controlling paging in a plurality of mobile switching centers (MSCs) in a radio telecommunications network.

2. Description of Related Art

In existing radio telecommunications networks, there are currently both analog and digital mobile stations in operation. Estimates of the number of analog mobile stations in operation indicate that there may be approximately 70 million analog mobile stations in operation despite the introduction of digital mobile stations a number of years ago. Therefore, cellular telecommunications networks must continue to support analog mobile stations for years to come, and solutions to problems that are unique to analog mobile stations are still desirable.

A common problem with analog mobile stations is their tendency to rescan for control channels prior to making a network access over the air interface. This tendency to rescan results in various border-related problems when the mobile stations are located near a border mobile switching center (border MSC). For example, several page attempts may be required in both a serving MSC and border MSCs to locate a mobile station operating near the border. Some of these problems were solved at the network level through the introduction of the InterSystemPage and the UnsolicitedPageResponse messages. However, when multiple page attempts are required, multiple intersystem signaling messages must be sent, adding considerably to the intersystem signaling load.

In existing telecommunications networks, the serving MSC sends an InterSystemPage message to the border MSCs associated with the paging area. When the page response time in the serving MSC expires and no page response has been received from either the serving MSC or a border MSC, another paging attempt may be performed, if defined by the operator. If the next paging attempt also covers a paging area spanning multiple MSCs, another InterSystemPage message must be sent from the serving MSC to the border MSCs. This is a burdensome amount of signaling. In addition, the serving MSC does not know whether any of the border MSCs are still in the process of paging for the mobile station, or if an unreported fault has occurred. Also, call disconnections may occur due to system timeout and the fact that there may be insufficient time following a no page response to transfer the call to voice mail.

There are no known prior art teachings of a solution to the aforementioned deficiency and shortcoming such as that described and claimed herein.

In order to overcome the disadvantage of existing solutions, it would be advantageous to have a method of controlling paging in a plurality of mobile switching centers in a radio telecommunications network. Such a method would increase the probability of delivering a call to an analog mobile station located close to an intersystem border, deliver the call while minimizing the signaling load between the cross-border MSCs, decrease the call setup time, and reduce the number of call disconnections due to system timeout by ensuring that the home location register (HLR) of the called party has sufficient time to allow the call to be transferred to voice mail in the event there is no page response from the called mobile station. The present invention provides such a method.

SUMMARY OF THE INVENTION

In one aspect, the present invention is a method of paging for a mobile station operating in a radio telecommunications network having a serving mobile switching center (MSC) and at least one border MSC. The method includes the steps of paging for the mobile station in the serving MSC, and sending an intersystem paging message from the serving MSC to the border MSC. The intersystem paging message includes an instruction to page the mobile station, an indication of how many page attempts to perform, and an indication of a maximum time allotted to complete the paging process. A maximum time period for completion of the page attempts in the border MSC is calculated by multiplying the number of page attempts to be performed times the page response time, and adding a signaling delay compensation time. If a page response is received in the serving MSC prior to expiration of the maximum time period for completion of the page attempts in the border MSC, the method may include sending a release message from the serving MSC to the border MSC to release paging resources in the border MSC being utilized to page the mobile station.

In another aspect, the present invention is a method of paging for a mobile station operating in a radio telecommunications network having a serving mobile switching center (MSC) and a plurality of border MSCs. The method comprises the steps of paging for the mobile station in the serving MSC, and sending an intersystem paging message from the serving MSC to each of the plurality of border MSCs. The intersystem paging message includes an instruction to page the mobile station, an indication of a number of page attempts to perform, and an indication of the maximum time allotted to complete the paging process. If a page response is received in the serving MSC prior to expiration of the maximum time period for completion of the page attempts in the border MSCs, the method may include sending a release message from the serving MSC to the border MSCs to release paging resources in the border MSCs being utilized to page the mobile station. If a page response is received in one of the border MSCs prior to expiration of the maximum time period for completion of the page attempts, the method stops internal paging in the serving MSC and may send a release message from the serving MSC to the non-responding border MSCs from which no response was received, to release paging resources in the non-responding border MSCs.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 2 is a chart illustrating the parameters of the InterSystemPage Invoke message modified in accordance with the teachings of the present invention;

FIG. 3 is a chart illustrating the parameters of the InterSystemPage (ISPAGE) Return Result message utilized in the method of the present invention;

FIG. 4 is a chart illustrating the parameters of the RELEASE Invoke message utilized in the method of the present invention;

FIG. 5 is a chart illustrating the information elements of the PageCount parameter of the InterSystemPage (ISPAGE) Invoke message;

FIG. 6 is a chart illustrating the information elements of the PageResponseTime (PAGETIM) parameter of the InterSystemPage (ISPAGE) Invoke message;

FIG. 7A is a chart illustrating the information elements of the PageIndicator (PAGEIND) parameter of the InterSystemPage (ISPAGE) Invoke message;

FIG. 7B is a table of values for octet-1 of the PageIndicator parameter as utilized in the present invention;

DETAILED DESCRIPTION OF EMBODIMENTS

The present invention is a method of controlling paging in a plurality of mobile switching centers (MSCs) in a radio telecommunications network which adds timing flexibility to the paging process in the serving MSC and its border MSCs. Although any intersystem signaling protocol may be utilized with the present invention, the preferred embodiment described herein utilizes ANSI-41 which is hereby incorporated by reference herein. The serving MSC sends the InterSystemPage message (ISPAGE) to the border MSCs only once, even if the first paging attempt fails and another paging attempt requiring paging by border MSCs is initiated. Included in the InterSystemPage message are new parameters which inform the border MSCs of the number of page attempts to be performed in the border MSC (PageCount) and the maximum time allotted to complete the paging process in the border MSC (PageResponseTime). The serving MSC determines the page response time for each page attempt in the border MSC. An additional delay is also allowed to compensate for SS7 signaling delay time and voice channel designation/answer time in the border MSC.

After sending the InterSystemPage message, the serving MSC continues to page for the mobile station in the serving MSC's operating area. If a page response is received within the serving MSC, the paging resources in the border MSCs may be released. If a response is not received by the end of the last page attempt in the serving MSC, the serving MSC determines whether it has to wait for an answer from the border MSCs. A total page response time is calculated in the serving MSC by taking into account the entry time of the Routing Request Invoke message, the signaling delay in the border system, the average time for designation of a voice channel, and an additional average time for transferring the call to voice mail in the event of a no page response condition. If the total page response time has not expired by the end of the last page attempt in the serving MSC, the serving MSC waits for a page response indication from the border MSCs. If the total page response time expires without a page response, the serving MSC sends a message (such as a Routing Request Return Result message) to the HLR and includes an AccessDeniedReason parameter with a "NoPageResponse" information element.

Figure 1A:
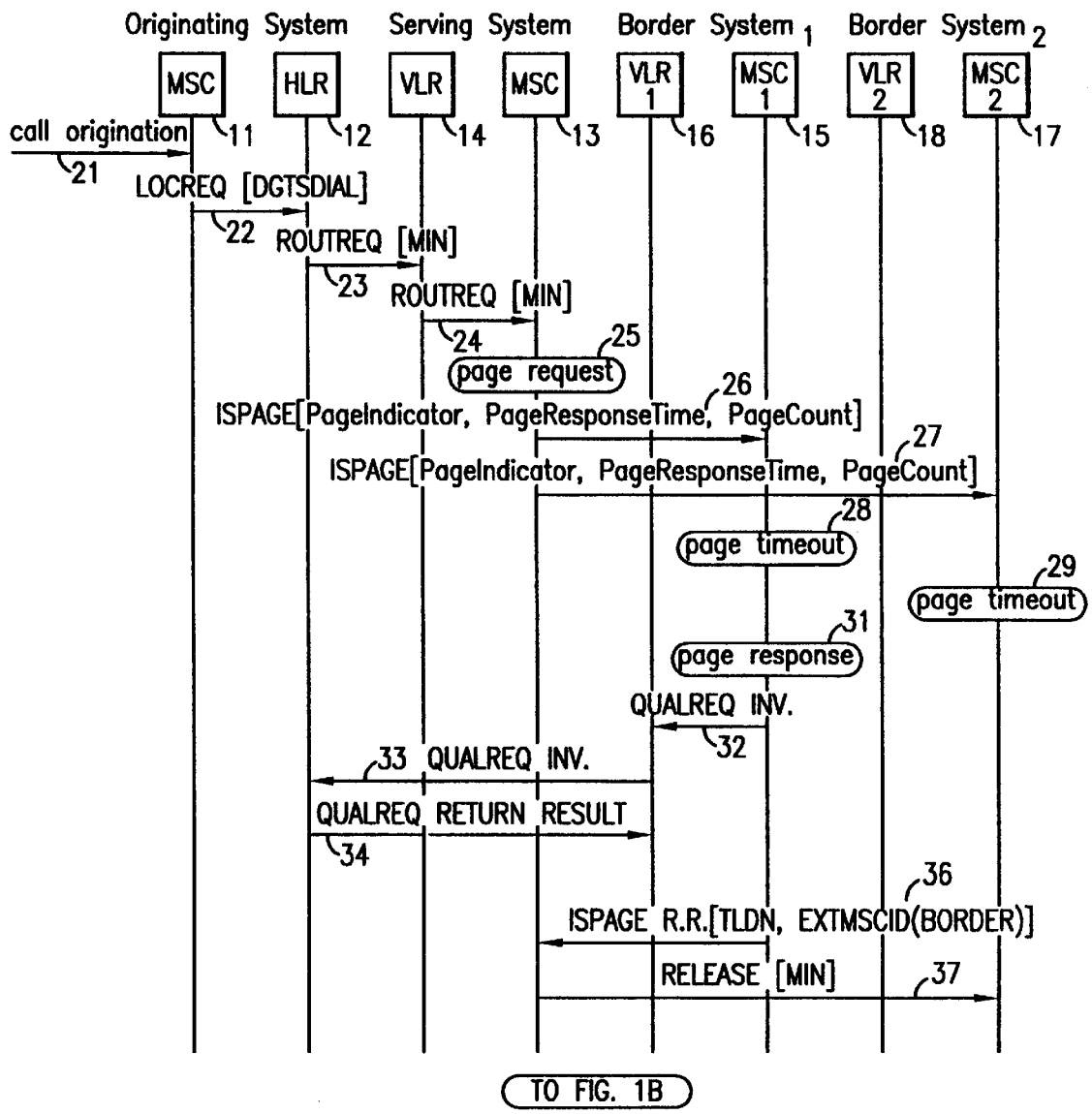
FIGS. 1A and 1B are a message flow diagram illustrating call delivery invocation to an idle mobile station utilizing intersystem paging between a serving MSC and a plurality of border MSCs in a cellular network implemented in accordance with the teachings of the present invention.
Figure 1B:
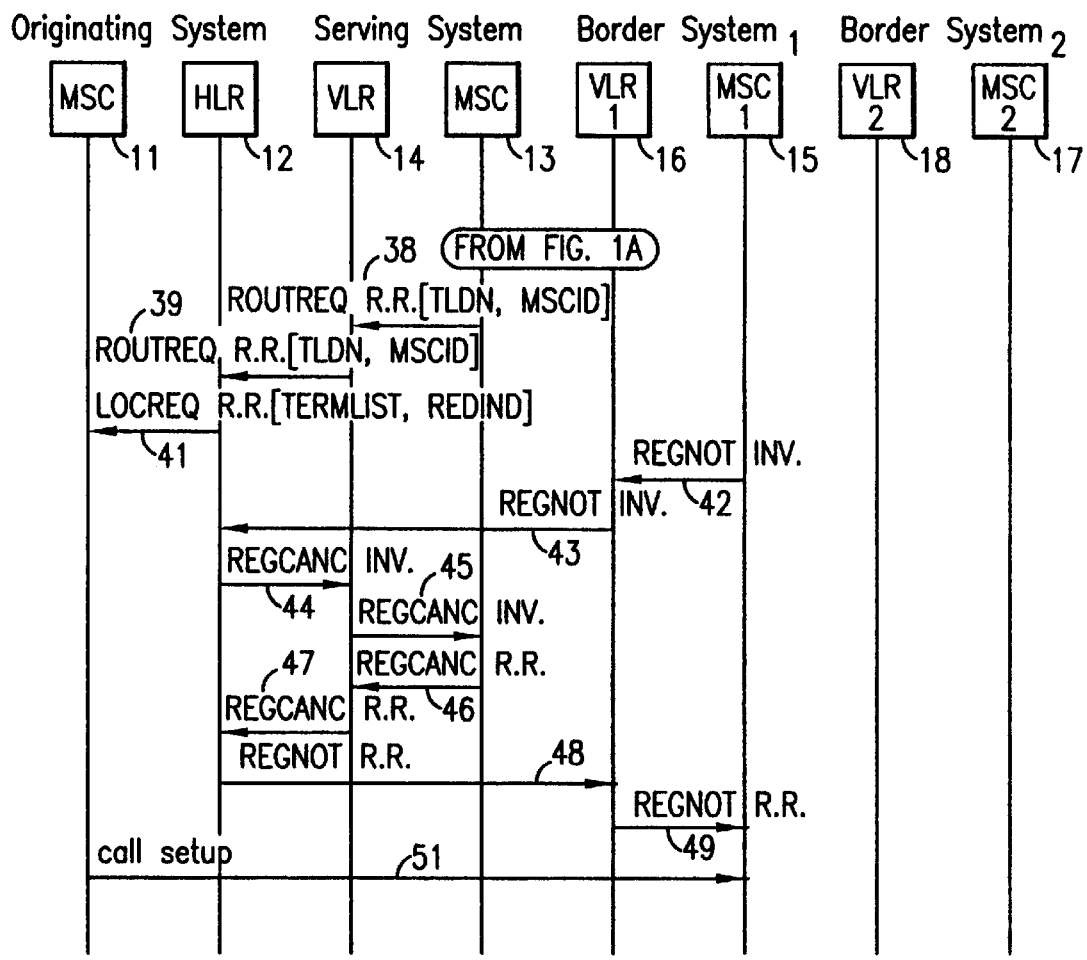

FIGS. 1A and 1B are a message flow diagram illustrating call delivery invocation to an idle mobile station utilizing intersystem paging implemented in a cellular network in accordance with the teachings of the present invention. Referring first to FIG. 1A, the network nodes include an originating MSC 11 and an associated home location register (HLR) 12, a serving MSC 13 and a serving system visitor location register (VLR) 14, a first border MSC (MSC$_1$) 15 and an associated VLR$_1$ 16, and a second border MSC (MSC$_2$) 17 and an associated VLR$_2$ 18. For simplicity, the called mobile station is not shown, but it is understood that the called mobile station is operating within the service areas of the serving MSC 13, border MSC$_1$, or border MSC$_2$.

A call origination 21 for the called mobile station is first received in the originating MSC 11. The originating MSC sends a LOCREQ Invoke message 22 to the HLR 12 and includes the digits dialed (DGTSDIAL). The HLR sends a ROUTREQ Invoke message 23 to the serving system VLR 14 and includes the mobile identification number (MIN) of the called mobile station. The serving system VLR sends a ROUTREQ Invoke message 24 to the serving MSC 13 and includes the MIN. At 25, the serving MSC initiates local paging in its service area for the called mobile station. At 26, the serving MSC sends an InterSystemPage (ISPAGE) Invoke message to border MSC$_1$, and at 27, the serving MSC sends an InterSystemPage (ISPAGE) Invoke message to border MSC$_2$. The ISPAGE messages may be sent before the serving MSC initiates local paging, at the time local paging is initiated, or after first page time-out.

The ISPAGE messages are sent according to the serving MSC's topographical map, and include a PageIndicator parameter indicating whether the border MSC is to page for the mobile station or merely listen for an unsolicited page response. The ISPAGE messages also include the MSCID of the originating MSC 11, a PageResponseTime parameter, and a PageCount parameter. The originating MSCID is needed if call redirection is required. The PageResponseTime parameter informs the border MSCs of the maximum time for completion of the paging process. The serving MSC may order identical page response times for each page attempt, or may order different page response times for different page attempts. The PageCount parameter informs the border MSCs of the maximum number of page attempts that they are each to perform. This parameter may be set by the system operator, and in the preferred embodiment, allows a maximum of two (2) page attempts.

Thus, the number of page attempts and the page response time for each border MSC is controlled by the serving MSC 13. The border MSCs may utilize internal default response time values and page attempt definitions if the optional parameters PageCount and PageResponseTime are not supported. The serving MSC, however, waits for the total page response time calculated from the ISPAGE message parameters before returning a response to the HLR 12. This allows the serving MSC time to transfer the call to voice mail, if required.

The serving MSC 13 may calculate the total page response times for the border MSCs utilizing an internal algorithm that takes the following factors into consideration:

(1) The number of times the serving MSC plans to initiate an intersystem page;
(2) The overall page response time in the serving MSC, based upon the number of page attempts that are to be initiated;
(3) The maximum time allotted to complete the paging process in the serving MSC;
(4) Average time required for voice channel designation/answer (approximately 1 second);
(5) Average SS7 signaling delay;
(6) ANSI-41 routing request timer (RRT);
(7) The time from page order to page response of the mobile station (approximately 5 seconds); and
(8) Average time to transfer a call to voice mail upon no page response (approximately 1 second).

Alternatively, these factors may be defined by the system operator.

Following receipt of the ISPAGE message in each border MSC, the border MSCs then page for the called mobile station in accordance with the instructions received in the ISPAGE messages. The scenario depicted in FIG. 1A shows that no page responses are received from the mobile station during the first page attempt. Therefore, there is a page timeout for $MSC_1$ at 28, and a page timeout for $MSC_2$ at 29. Following the page timeouts, the border MSCs attempt a second page.

At 31, a page response is received from the called mobile station at border $MSC_1$. Optionally, the border $MSC_2$ 15 may send a Qualification Request (QUALREQ) Invoke message 32 to its $VLR_1$ 16 indicating border access. If the service profile of the called mobile station is unknown to the $VLR_1$, the $VLR_1$ sends a QUALREQ Invoke message 33 to the HLR 12 associated with the mobile station. The HLR sends a QUALREQ Return Result message 34 to the $VLR_1$ and includes the mobile station's service profile information. The $VLR_1$ then sends a QUALREQ Return Result message 35 to the border $MSC_1$ and includes the mobile station's service profile information. The border $MSC_1$ then assigns the mobile station to a voice/traffic channel and allocates a routing number such as a temporary location directory number (TLDN) to the mobile station. The border $MSC_1$ may then further confirm the mobile station's presence through, for example, a voice channel audit or other means. If the mobile station is authentication capable, the border $MSC_1$ may optionally authenticate it using a control channel or a voice channel.

The border $MSC_1$ then sends an ISPAGE Return Result message 36 to the serving MSC 13 and includes the TLDN for the mobile station and the MSCID of the border $MSC_1$. Optionally, the serving MSC 13 may send a RELEASE message 37 to any other border MSCs (for example, $MSC_2$) that may still be paging the mobile station, in order to free its paging resources. The serving MSC also releases its internal paging resources at that time. Alternatively, if a page response is received in the serving MSC prior to the expiration of the total page response time in any of the border MSCs, the serving MSC may send the RELEASE message to those border MSCs that are still paging. If the time remaining in the total page response time is less than a predetermined threshold, the RELEASE message may not be sent. The process then moves to FIG. 1B.

The serving MSC 13 then sends a ROUTREQ Return Result message 38 to the serving system VLR 14 and includes the TLDN and the MSCID for the border $MSC_1$. The serving system VLR then sends a ROUTREQ Return Result message 39 to the originating system HLR 12 and includes the TLDN and the Extended MSCID for the border $MSC_1$. The HLR then sends a LOCREQ Return Result message 41 to the originating MSC 11 and includes routing information in the form of a TerminationList parameter along with an indication of the reason for extending the incoming call (i.e., for call delivery) in a DMH_RedirectionIndicator parameter.

After responding to the ISPAGE message, the border $MSC_1$ sends a Registration Notification (REGNOT) Invoke message 42 to the border $VLR_1$. The $VLR_1$ sends a REGNOT Invoke to the originating system HLR 12. The HLR cancels the registration at the visited serving system by sending a Registration Cancellation (REGCANC) Invoke message 44 to the serving system VLR 14. The serving system VLR then sends a REGCANC Invoke message 45 to the serving MSC 13. The serving MSC sends a REGCANC Return Result message 46 to the serving system VLR which sends a REGCANC Return Result message 47 to the originating system HLR. The HLR then sends a REGNOT Return Result message 48 to the border $VLR_1$ which sends a REGNOT Return Result message 49 to the border $MSC_1$. The originating MSC 11 then establishes a voice path 51 to the border $MSC_1$ utilizing existing interconnection protocols (e.g., SS7) and the routing information provided in the LOCREQ Return Result message 41. If the border $MSC_1$ must initiate call redirection, a Redirection Request (REDREQ) Invoke message is sent from the border $MSC_1$ 15 to the originating MSC 11.

FIG. 2 is a chart illustrating the parameters of the InterSystemPage (ISPAGE) Invoke message 26 modified in accordance with the teachings of the present invention. The InterSystemPage operation is initiated with a TCAP INVOKE (LAST). This is carried by a TCAP QUERY WITH PERMISSION package. The ISPAGE Invoke message includes a PageCount parameter 55, a PageIndicator parameter 56, and a PageResponseTime parameter 57. The PageCount parameter informs the border MSCs of the maximum number of pages that they are each to perform. The PageIndicator parameter indicates whether the border MSC is to page for the mobile station or merely listen for an unsolicited page response. The PageResponseTime parameter informs the border MSCs of the maximum time allotted to complete the paging process. The border MSC can then calculate the total page response time for the paging process by adding a delay time which may comprise, for example, the SS7 signaling delay time and the voice channel designation/answer time in the border MSC.

FIG. 3 is a chart illustrating the parameters of the InterSystemPage (ISPAGE) Return Result message 36 utilized in the method of the present invention. A standard ANSI-41 ISPAGE Return Result message may be utilized in the present invention.

FIG. 4 is a chart illustrating the parameters of the RELEASE Invoke message 37 utilized in the method of the present invention. The Release operation is utilized to request the release of resources for a call segment. The Release operation is initiated with a TCAP INVOKE (LAST). This is carried by a TCAP QUERY WITHOUT PERMISSION package. The RELEASE Invoke message includes the MIN 61 of the called mobile station to identify the MIN-related resources to release.

FIG. 5 is a chart illustrating the information elements of the PageCount (PAGECOUNT) parameter 55 of the InterSystemPage (ISPAGE) Invoke message 26. The PageCount parameter is utilized to indicate the maximum number of paging attempts that the receiving border MSC is expected to perform.

FIG. 6 is a chart illustrating the information elements of the PageResponseTime (PAGETIM) parameter 57 of the InterSystemPage (ISPAGE) Invoke message 26. The PageResponseTime parameter is utilized to indicate the maximum time that the receiving border MSC is allotted to complete the paging process.

FIG. 7A is a chart illustrating the information elements of the PageIndicator (PAGEIND) parameter 56 of the InterSystemPage (ISPAGE) Invoke message 26. The PageIndicator parameter is utilized to indicate whether the receiving border MSC should page for the called mobile station or merely listen for an unsolicited page response.

FIG. 7B is a table of values for octet-1 (62) of the PageIndicator parameter 56 as utilized in the present invention.

Figure 8:
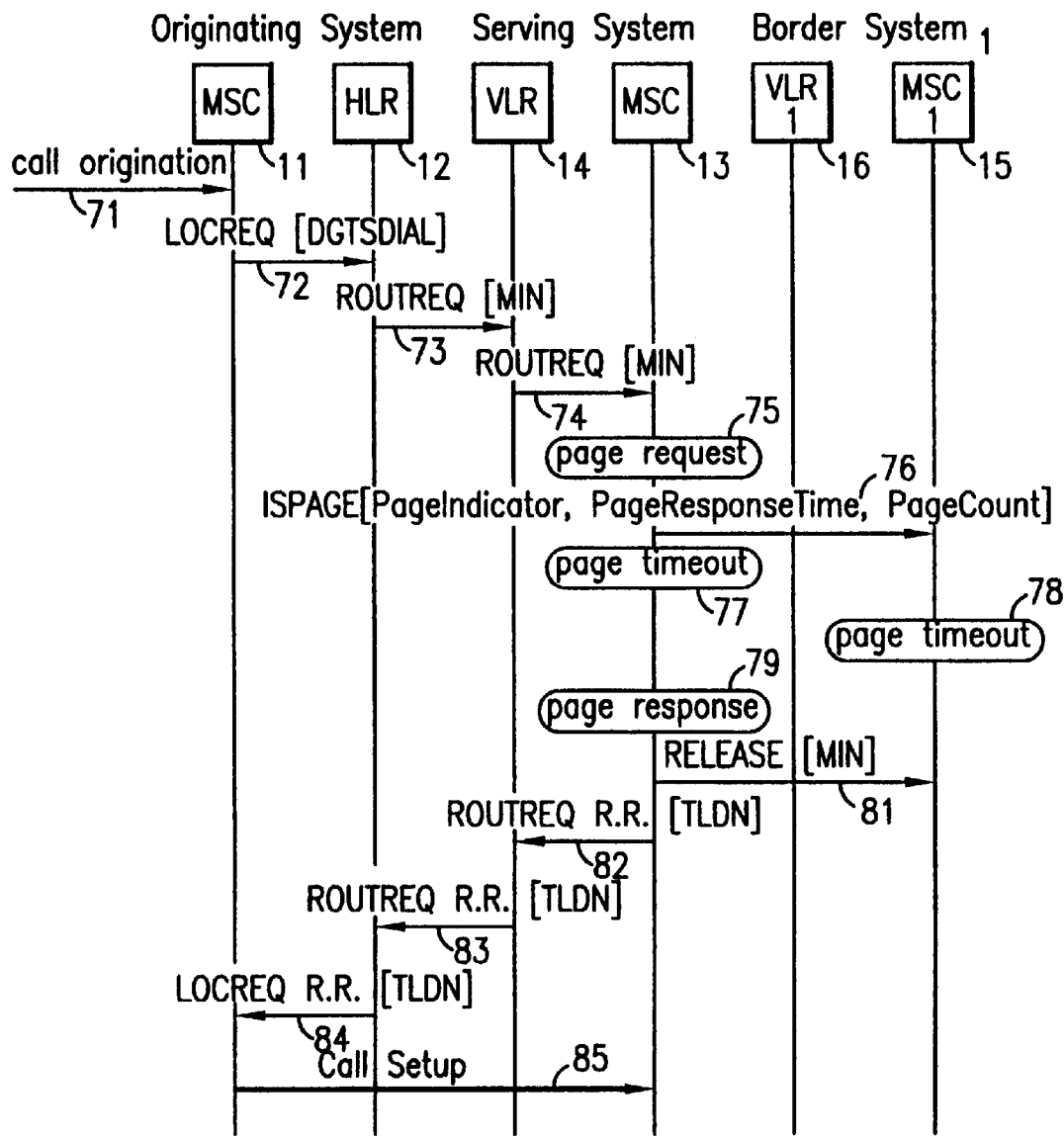
FIG. 8 is a message flow diagram illustrating call delivery invocation to an idle mobile station utilizing intersystem paging between a serving MSC and a single border MSC in a cellular network implemented in accordance with the teachings of the present invention.

FIG. 8 is a message flow diagram illustrating call delivery invocation to an idle mobile station utilizing intersystem paging between a serving MSC 13 and a single border MSC 15 implemented in a cellular network in accordance with the teachings of the present invention. A call origination 71 for a called mobile station is first received in the originating MSC 11. The originating MSC sends a LOCREQ Invoke message 72 to the HLR 12 and includes the digits dialed (DGTSDIAL). The HLR sends a ROUTREQ Invoke message 73 to the serving system VLR 14 and includes the mobile identification number (MIN) of the called mobile station. The serving system VLR sends a ROUTREQ Invoke message 74 to the serving MSC 13 and includes the MIN. At 75, the serving MSC initiates local paging in its service area for the called mobile station. At 76, the serving MSC sends an InterSystemPage (ISPAGE) Invoke message to border $MSC_1$. The ISPAGE message may be sent before the serving MSC initiates local paging, at the time local paging is initiated, or after first page time-out.

The ISPAGE message includes the PageIndicator parameter 56 (FIG. 2) indicating whether the border $MSC_1$ is to page for the mobile station or merely listen for an unsolicited page response. The ISPAGE message also includes the PageResponseTime parameter 57 and the PageCount parameter 55. The PageResponseTime parameter informs the border $MSC_1$ of the maximum time allotted to complete the paging process. The PageCount parameter informs the border $MSC_1$ of the maximum number of page attempts that are to be performed.

Following receipt of the ISPAGE message in the border $MSC_1$ 15, the border $MSC_1$ then pages for the called mobile station in accordance with the instructions received in the ISPAGE message. The scenario depicted in FIG. 8 shows that no page responses are received from the mobile station during the first page attempt in either the serving MSC 13 or the border $MSC_1$. Therefore, there is a page timeout for the serving MSC at 77 and for the border $MSC_1$ at 78. Following the page timeouts, the serving MSC and the border $MSC_1$ attempt a second page.

At 79, a page response is received from the called mobile station at the serving MSC. Optionally, the serving MSC 13 may send a RELEASE message 81 to the border $MSC_1$ in order to free its paging resources. The serving MSC then sends a ROUTREQ Return Result message 82 to the serving system VLR 14 and includes the routing number (TLDN) for the mobile station. The serving system VLR then sends a ROUTREQ Return Result message 83 to the originating system HLR 12 and includes the TLDN. The HLR then sends a LOCREQ Return Result message 84 to the originating MSC 11 and includes the TLDN. The originating MSC 11 then establishes a voice path 85 to the serving MSC utilizing existing interconnection protocols (e.g., SS7) and the routing information provided in the LOCREQ Return Result message 84.

Figure 9:
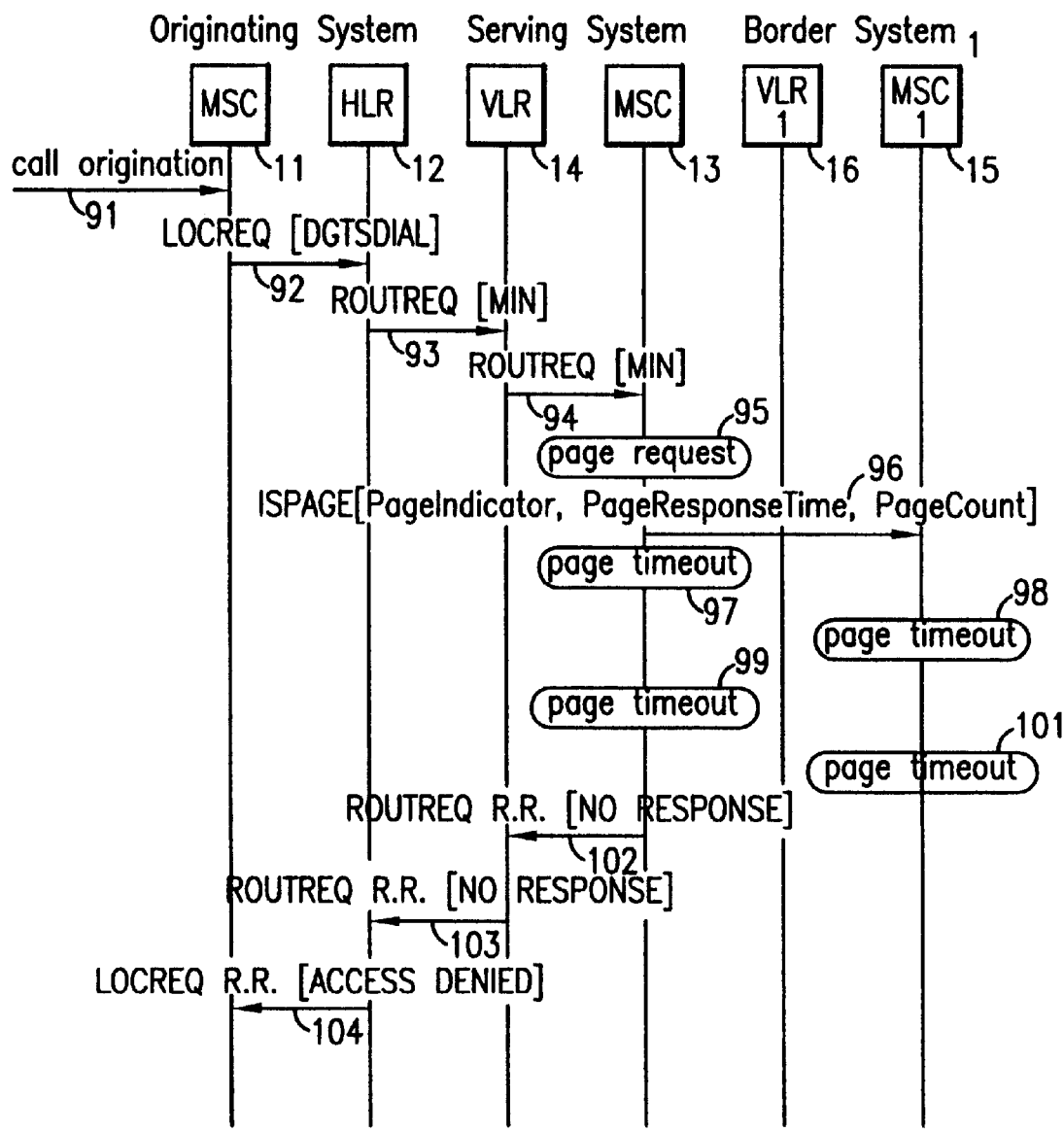
FIG. 9 is a message flow diagram illustrating intersystem paging between a serving MSC and a single border MSC when no response is received from a called mobile station.

FIG. 9 is a message flow diagram illustrating intersystem paging between a serving MSC 13 and a single border MSC 15 when no response is received from a called mobile station. A call origination 91 for a called mobile station is first received in the originating MSC 11. The originating MSC sends a LOCREQ Invoke message 92 to the HLR 12 and includes the digits dialed (DGTSDIAL). The HLR sends a ROUTREQ Invoke message 93 to the serving system VLR 14 and includes the mobile identification number (MIN) of the called mobile station. The serving system VLR sends a ROUTREQ Invoke message 94 to the serving MSC 13 and includes the MIN. At 95, the serving MSC initiates local paging in its service area for the called mobile station. At 96, the serving MSC sends an InterSystemPage (ISPAGE) Invoke message to border $MSC_1$. The ISPAGE message may be sent before the serving MSC initiates local paging, at the time local paging is initiated, or after first page time-out.

The ISPAGE message includes the PageIndicator parameter 56 (FIG. 2) indicating whether the border $MSC_1$ is to page for the mobile station or merely listen for an unsolicited page response. The ISPAGE message also includes the PageResponseTime parameter 57 and the PageCount parameter 55. The PageResponseTime parameter informs the border $MSC_1$ of the maximum time allotted to complete the paging process. The PageCount parameter informs the border $MSC_1$ of the maximum number of page attempts that are to be performed.

Following receipt of the ISPAGE message in the border $MSC_1$ 15, the border $MSC_1$ then pages for the called mobile station in accordance with the instructions received in the ISPAGE message. The scenario depicted in FIG. 9 shows that no page responses are received from the mobile station during the first page attempt in either the serving MSC 13 or the border $MSC_1$. Therefore, there is a first page timeout for the serving MSC at 97 and for the border $MSC_1$ at 98. Following the page timeouts, the serving MSC and the border $MSC_1$ attempt a second page. Once again, no page responses are received from the mobile station during the second page attempt in either the serving MSC 13 or the border $MSC_1$. Therefore, there is a second page timeout for the serving MSC at 99 and for the border $MSC_1$ at 101. The serving MSC determines that the timer has expired for both local and inter-system paging, and then sends a ROUTREQ Return Result message 102 to the serving system VLR 14 and includes an indication that there was no response from the called mobile station. The serving system VLR then sends a ROUTREQ Return Result message 103 to the originating system HLR 12 and includes the no response indication. The HLR then sends a LOCREQ Return Result message 104 to the originating MSC 11 and indicates that access is denied due to no response from the called mobile station.

Figure 10:
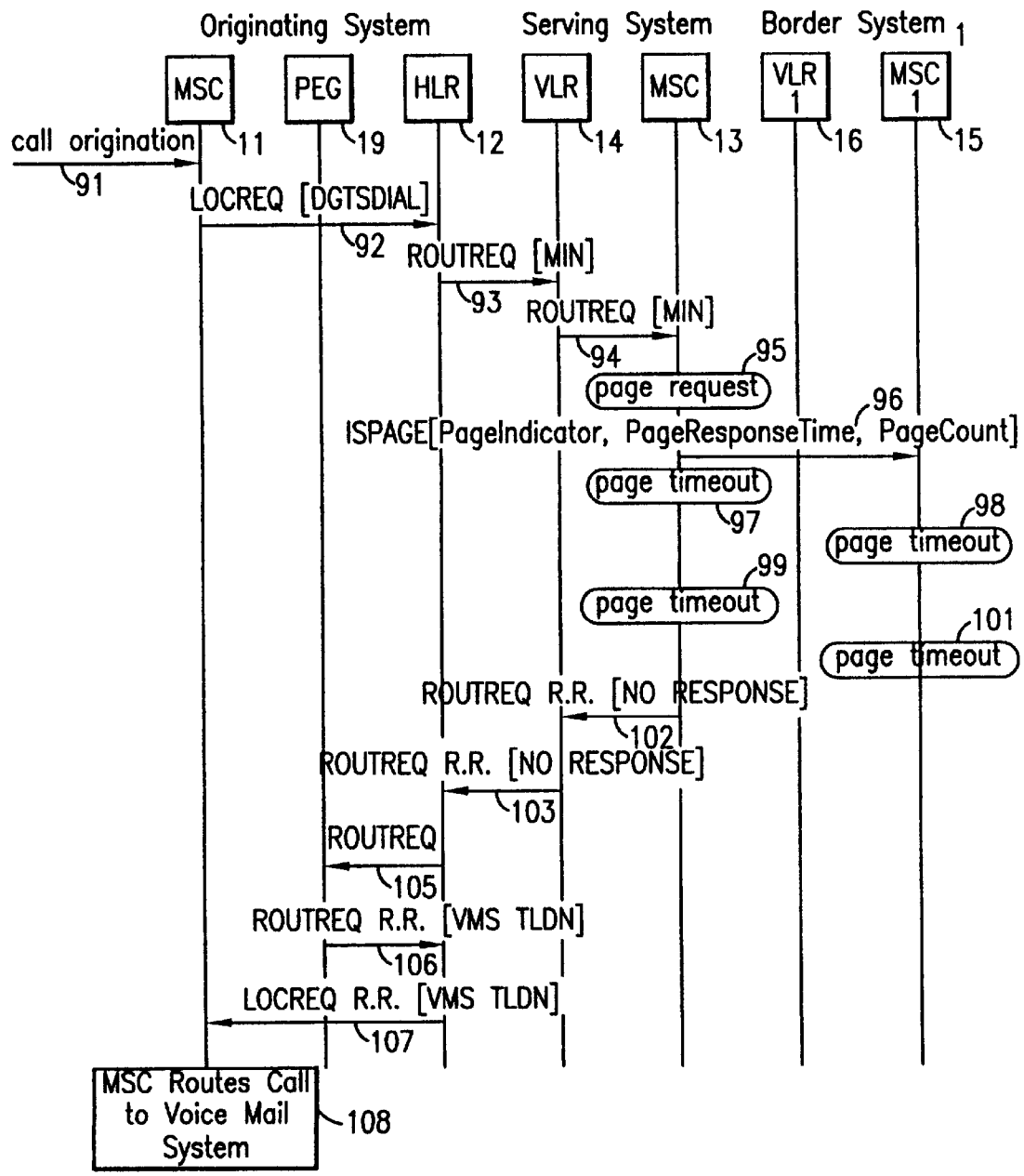
FIG. 10 is a message flow diagram illustrating intersystem paging between a serving MSC and a single border MSC when no response is received from a called mobile station, and the call is routed to a voice mail system (VMS).

FIG. 10 is a message flow diagram illustrating intersystem paging between a serving MSC 13 and a single border MSC 15 when no response is received from a called mobile station, and the call is routed to a voice mail system (VMS).

The message flow is identical to FIG. 9 through step 103 where the serving system VLR 14 sends the ROUTREQ Return Result message to the originating system HLR 12 and includes the no response indication. If the subscriber profile in the HLR 12 indicates a transfer-on-no-page-response class, the HLR initiates re-routing of the call to voice mail by sending a ROUTREQ Invoke message 105 to a Peripheral Equipment Gateway (PEG) 19. The PEG is utilized to route calls from the originating MSC 11 through a voice trunk to a Voice Mail System (VMS) (not shown). Functionally, the PEG 19 is an interface between the MSC and the VMS. The PEG sends a ROUTREQ Return Result message 106 to the HLR and includes a routing number for the VMS such as a Temporary Location Directory Number (TLDN). The HLR then sends a LOCREQ Return Result message 107 to the originating MSC 11 and includes the TLDN of the VMS. At 108, the originating MSC routes the call to the VMS. This process is completed before any system timeouts occur.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of paging for a mobile station operating in a radio telecommunications network having a serving mobile switching center (MSC) and a border MSC, said method comprising the steps of:
   calculating in the serving MSC, a maximum time allotted to complete the paging process;
   paging for the mobile station in the serving MSC; and
   sending an intersystem paging message from the serving MSC to the border MSC, said intersystem paging message including an instruction to page the mobile station, an indication of a number of page attempts to perform, and an indication of the maximum time allotted to complete the paging process.

2. The method of paging for a mobile station operating in a radio telecommunications network of claim 1 wherein said step of sending an intersystem paging message from the serving MSC to the border MSC is performed prior to initiating paging for the mobile station in the serving MSC.

3. The method of paging for a mobile station operating in a radio telecommunications network of claim 1 wherein said step of sending an intersystem paging message from the serving MSC to the border MSC is performed at the time paging for the mobile station is initiated in the serving MSC.

4. The method of paging for a mobile station operating in a radio telecommunications network of claim 1 wherein said step of sending an intersystem paging message from the serving MSC to the border MSC is performed after first page time-out in the serving MSC.

5. The method of paging for a mobile station operating in a radio telecommunications network of claim 1 further comprising the step of calculating in the serving MSC, a maximum time period for completion of the page attempts in the border MSC, said calculating step including adding a delay compensation time to the time period indicated in the intersystem paging message.

6. The method of paging for a mobile station operating in a radio telecommunications network of claim 5 wherein said step of adding a delay compensation time includes adding a delay compensation time comprising a signaling delay time in the border MSC, an average voice channel designation time, and an average time to transfer the call to a voice mail system.

7. The method of paging for a mobile station operating in a radio telecommunications network of claim 5 further comprising the steps of:
   determining whether a page response is received from the mobile station in the serving MSC prior to expiration of the maximum time period for completion of the page attempts in the border MSC; and
   upon determining that a page response is received in the serving MSC prior to expiration of the maximum time period for completion of the page attempts in the border MSC, sending a release message from the serving MSC to the border MSC to release paging resources in the border MSC being utilized to page the mobile station.

8. The method of paging for a mobile station operating in a radio telecommunications network of claim 7 wherein said step of sending a release message from the serving MSC to the border MSC to release paging resources in the border MSC includes sending the release message only if the time remaining in the maximum time period for completion of the page attempts exceeds a predetermined threshold.

9. The method of paging for a mobile station operating in a radio telecommunications network of claim 7 further comprising the steps of:
   determining whether a page response is received from the mobile station in the border MSC prior to expiration of the maximum time period for completion of the page attempts; and
   stopping internal paging in the serving MSC upon determining that a page response is received in the border MSC prior to expiration of the maximum time period for completion of the page attempts.

10. The method of paging for a mobile station operating in a radio telecommunications network of claim 9 wherein said radio telecommunications network also includes a visitor location register (VLR) associated with the serving MSC, an originating MSC, and a home location register (HLR) associated with the originating MSC, said method further comprising, upon determining that a page response was not received in the serving MSC and a page response was not received in the border MSC prior to expiration of the maximum time period for completion of the page attempts, the steps of:
   sending a response message from the VLR to the HLR indicating no page response; and
   sending a response message from the HLR to the originating MSC indicating access denied.

11. The method of paging for a mobile station operating in a radio telecommunications network of claim 9 wherein said radio telecommunications network also includes a visitor location register (VLR) associated with the serving MSC, an originating MSC, a home location register (HLR) associated with the originating MSC, and a peripheral equipment gateway (PEG) associated with the originating MSC, said method further comprising, upon determining that a page response was not received in the serving MSC and a page response was not received in the border MSC prior to expiration of the maximum time period for completion of the page attempts, the steps of:
   sending a response message from the VLR to the HLR indicating no page response;
   sending a message from the HLR to the PEG to initiate routing of the call to a voice mail system (VMS);
   sending a routing number for the VMS in a response message from the PEG to the HLR;

sending the routing number for the VMS in a message from the HLR to the originating MSC; and routing the call to the VMS.

12. A method of paging for a mobile station operating in a radio telecommunications network having a serving mobile switching center (MSC) and a plurality of border MSCs, said method comprising the steps of:

calculating, in the serving MSC, a maximum time allotted to complete the paging process;

paging for the mobile station in the serving MSC; and sending an intersystem paging message from the serving MSC to each of the plurality of border MSCs, said intersystem paging message including an instruction to page the mobile station, an indication of a number of page attempts to perform, and an indication of the maximum time allotted to complete the paging process.

13. The method of paging for a mobile station operating in a radio telecommunications network of claim 12 further comprising the step of calculating in the serving MSC, a maximum time period for completion of the page attempts in each of the plurality of border MSCs, said calculating step including adding a delay compensation time for each border MSC.

14. The method of paging for a mobile station operating in a radio telecommunications network of claim 13 wherein said step of adding a delay compensation time includes adding a delay compensation time comprising a signaling delay time in each border MSC, an average voice channel designation time, and an average time to transfer the call to a voice mail system.

15. The method of paging for a mobile station operating in a radio telecommunications network of claim 13 further comprising the steps of:

determining whether a page response is received from the mobile station in the serving MSC prior to expiration of the maximum time period for completion of the page attempts in the border MSCs; and upon determining that a page response is received in the serving MSC prior to expiration of the maximum time period for completion of the page attempts in the border MSC, sending a release message from the serving MSC to each of the plurality of border MSCs to release paging resources in the border MSCs being utilized to page the mobile station.

16. The method of paging for a mobile station operating in a radio telecommunications network of claim 13 further comprising the steps of:

determining in the serving MSC, whether a page response is received from the mobile station in one of the plurality of border MSCs prior to expiration of the maximum time period for completion of the page attempts; and upon determining that a page response is received in one of the plurality of border MSCs prior to expiration of the maximum time period for completion of the page attempts, sending a release message from the serving MSC to non-responding border MSCs in which no response was received, to release paging resources in the non-responding border MSCs.

17. The method of paging for a mobile station operating in a radio telecommunications network of claim 16 further comprising the step of stopping internal paging in the serving MSC upon determining that a page response is received in one of the plurality of border MSCs prior to expiration of the maximum time period for completion of the page attempts.

18. The method of paging for a mobile station operating in a radio telecommunications network of claim 17 wherein said radio telecommunications network also includes a visitor location register (VLR) associated with the serving MSC, an originating MSC, and a home location register (HLR) associated with the originating MSC, said method further comprising, upon determining that a page response was not received in the serving MSC and a page response was not received in any of the plurality of border MSCs prior to expiration of the maximum time period for completion of the page attempts, the steps of:

sending a response message from the VLR to the HLR indicating no page response; and sending a response message from the HLR to the originating MSC indicating access denied.

19. The method of paging for a mobile station operating in a radio telecommunications network of claim 17 wherein said radio telecommunications network also includes a visitor location register (VLR) associated with the serving MSC, an originating MSC, a home location register (HLR) associated with the originating MSC, and a peripheral equipment gateway (PEG) associated with the originating MSC, said method further comprising, upon determining that a page response was not received in the serving MSC and a page response was not received in any of the plurality of border MSCs prior to expiration of the maximum time period for completion of the page attempts, the steps of:

sending a response message from the VLR to the HLR indicating no page response;

sending a message from the HLR to the PEG to initiate routing of the call to a voice mail system (VMS);

sending a routing number for the VMS in a response message from the PEG to the HLR;

sending the routing number for the VMS in a message from the HLR to the originating MSC; and routing the call to the VMS.

* * * * *